April 16, 1963     T. O. MATHUES     3,085,608

BAG OF PERMEABLE PLASTIC MATERIAL

Filed June 25, 1959

INVENTOR.
Thomas O. Mathues
BY
His Attorney

United States Patent Office 3,085,608
Patented Apr. 16, 1963

3,085,608
BAG OF PERMEABLE PLASTIC MATERIAL
Thomas O. Mathues, Dayton, Ohio, assignor to General Motors Corporation, Detroit, Mich., a corporation of Delaware
Filed June 25, 1959, Ser. No. 822,906
2 Claims. (Cl. 150—1)

This invention relates to plastic sheet material and methods for making such sheet material.

It is an object of this invention to provide a plastic sheet or bag and method for making same which is permeable to air and is substantially impermeable to water. This object is carried out by providing the plastic bag with a plurality of vents in the form of minute flap valves caused by perforating the material of the bag without removing the material from the perforations whereby pressure on either side of the bag causes the plurality of minute valves to open to permit the passage of air therethrough and wherein the perforations are of such small magnitude that water, for example, on the exterior of the bag does not pass through the small perforations due to the surface tension effect.

Another object of the invention is to provide a polyethylene sheet or bag and method for making the same wherein the polyethylene material is perforated in a more or less regulated pattern with a myriad of perforations spaced a predetermined distance apart and having a predetermined size whereby the bag is permeable to air under slight pressure above or below atmospheric pressure and is substantially impermeable to moisture or water.

A still further object of the invention is to provide a method for perforating an already formed bag so as to make it permeable to air.

Further objects and advantages of the present invention will be apparent from the following description, reference being had to the accompanying drawings wherein preferred embodiments of the present invention are clearly shown.

Figure 1:
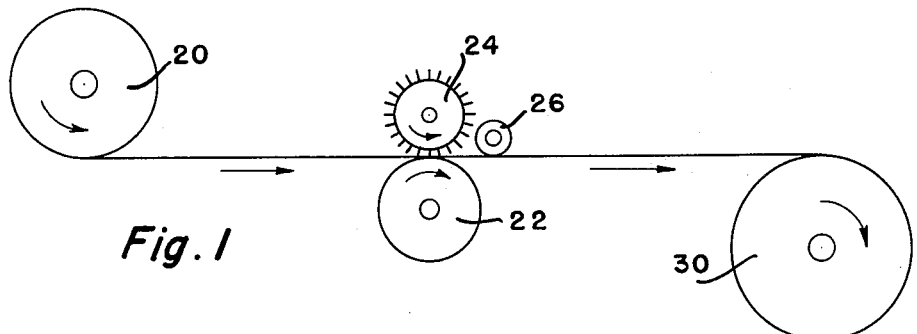
FIGURE 1 shows an apparatus used for perforating plastic tubing stock.
Figure 2:
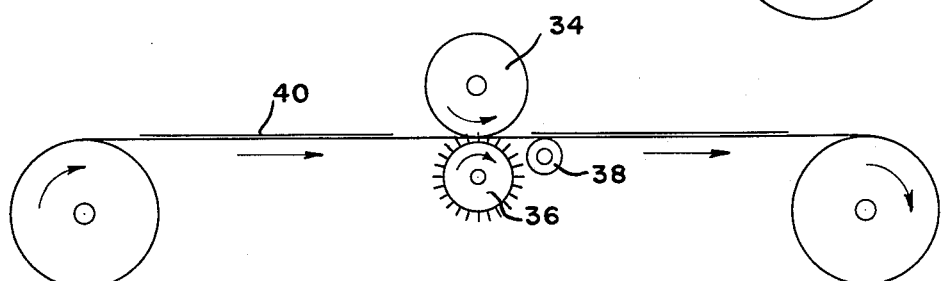
FIGURE 2 shows an apparatus used for perforating already formed bag material from plastic stock.

Plastic bags have recently come into extensive use as coverings for various commodities and, in this connection, one of the largest uses for plastic bags is in the dry cleaning industry wherein the bags have the desirable feature of being transparent so that clothing contained therein is readily observed exteriorly of the bag without opening the bag. Furthermore, the bag, due to the water resistant nature of the plastic used, protects the clothing against humidity and moisture. In most cases, the bags are made of polyethylene material which is inexpensive, water resistant and which is a transparent plastic that can be provided in very thin sheets or tubes to facilitate the manufacture of bags therefrom.

One disadvantage of the plastic bag is its inability to breathe, that is, to let air pressure pass through the bag. This disadvantage has brought about numerous serious accidents often resulting in death to infants. In these cases, a plastic bag has been placed over the infant's head and has been the cause of suffocation. This condition is amplified due to the fact that polyethylene, for example, becomes statically charged and is drawn to the surface of the face to form a more or less tight seal over the mouth and nose of the infant.

Another disadvantage of these bags, which is not so serious but which, nevertheless, causes difficulty in handling the bags, is their difficulty toward being folded or stacked. When the bags include any air therein, the open end of the bags are closed by static charges whereby they are difficult to fold or stack unless the air is progressively removed from the closed end of the bag toward the open end of the bag. This same condition frequently causes considerable difficulty in the use of these bags in closets and the like where the clothes are to be hung.

The present invention is directed to a means for venting the bags or making them permeable to air under a very slight pressure differential whereby it is possible to breathe through the material of the bag but where the venting means is so small and is formed so as to prevent or substantially prevent the ingress of water into the bags due to the surface tension effect of water In this manner, the bags are rendered harmless so far as children are concerned since, even if a bag is placed over the head of a child, it is possible to breathe through the material of the bag and, similarly, the bags are made more useful in industry since they may be stacked and packaged more easily.

According to our invention, these bags can be vented prior to the manufacture of the bags or they can be vented after the bags have been manufactured whichever appears to be more useful. Furthermore, since polyethylene, for example, has a wax-like surface, the bag sheds water and since the perforations or vents are of minute size and are more or less of a flap-like nature, the surface tension of the water on the material is such as to prevent passage of the water through the preforations whereby the bag is substantially impervious to the flow of water therethrough.

In place of polyethylene, any suitable plastic sheet material may be used, for example, "Mylar" (polyester film), polyvinyl chloride, etc. If the sheet is not to be subjected to water, cellophane (regenerated cellulose), polyvinyl alcohol, etc., are suitable. The sheet is still initially impermeable to water but, the films in this last case are not waterproof.

In practice, the limitations on the perforation spacing and size are, for the most part, dictated by practical factors. For example, the vent spacing at the maximum should be such that there will always be openings at both an infant's nose and mouth at the same time and, for this reason, one-half an inch maximum spacing appears to be a limit. Again, this is a practical limit and does not necessarily mean the spacing cannot be larger if safety factors do not enter into consideration. Similarly, the minimum spacing of the holes is dictated by practicality and this spacing should never be less than two times the size of the perforating device and preferably the minimum spacing from a practical standpoint should be about one-eighth of an inch since it is apparent that, as the perforations get closer, the material gets weaker.

The size of the vents at the lower end of the range is such that adequate breathing can be carried out therethrough to prevent suffocation. In this connection, a vent pierced with a needle of a .020 diameter appears to be the minimum size that is practical. Of course, with such a vent, the one-eighth of an inch spacing should be used. The largest perforation that can be used and still maintian the bag waterproof is one pierced with a .045 inch needle. When the perforations exceed this size, there is a tendency for water to leak through the perforations. When large perforations are used, the spacing may be increased toward the upper limit of the spacing.

It is understood that all of these limitations are of a practical nature and are specifically directed to breathing through the bag and that slight variations therefrom come within the purview of this invention since, if the needle is a .001–.002 of an inch larger or smaller than the sizes noted, for example, it is quite apparent that the device will function equally well since there is no sharp cut-off in size.

All of these dimensions are for the usual one-half mil polyethylene sheet material used for bags. If the material is slightly thicker, it is desirable to utilize slightly larger than the minimum size needles to assure satisfactory breathing therethrough. Most uplastic film material is abailable in thicknesses of from .2 of a mil to 4 mils.

In the manufacture of these bags and the perforation of the sheet material, two methods may be used. In the first, polyethylene tubing or flat stock may be perforated. This is accomplished as shown in FIGURE 1 wherein a supply of tubing is on reel 20 and passes flat in a double thickness in the direction of the arrow between a power driven soft rubber roll 22 and a power driven perforating roll 24. The perforating roll is covered with carding cloth wherein the needles affixed to the carding cloth are of the diameters noted. Immediately after the material passes through the roll, it passes beneath a hold-down roll 26 which pulls the material off the carding roll. The pierced tubing stock is then reeled upon a drum 30. Lengths of this tubing are cut off from the stock and are sealed at one end to form bags. The same procedure can be used for flat stock.

In the second method, where bags have already been formed, a power driven belt 32 is used made of burlap or other open weave material. This belt passes between an upper soft rubber roll 34 and a lower carding roll 36 cooperating therewith. A hold-down roll 38 follows the carding roll. As the belt passes between these rolls, non-perforated bags may be placed on the belt as shown at 40 and pass between the rolls 34 and 36. The needles on the carding roll pass through the open weave belt and through the material of the bag and the belt acts as a stripper for the bag since, if the belt is not used, the bags will hold to the carding roll and are very difficult to remove therefrom. By using the present method, it is a simple matter to reprocess already-formed bags for perforating the same.

Figure 3:
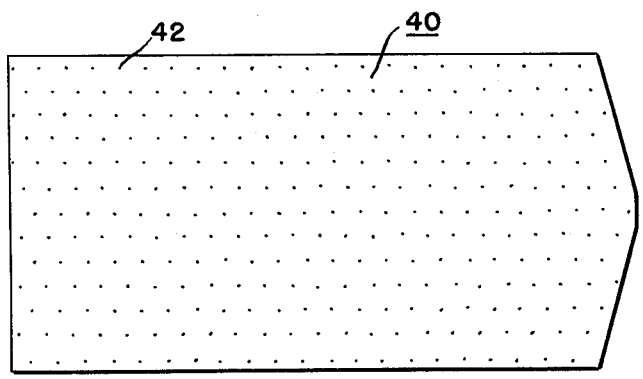
FIGURE 3 is a plan view of a plastic bag showing the extent of perforations therethrough.
Figure 4:
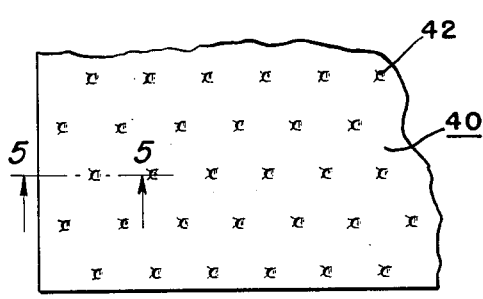
FIGURE 4 is a magnified section of the bag shown in FIGURE 3 wherein the perforations are shown more clearly.
Figure 5:
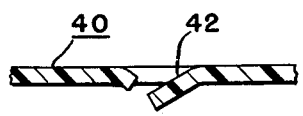
FIGURE 5 is a greatly enlarged section of one perforation in the vented position showing the valving effect of the perforation.

FIGURE 3 shows a bag 40 wherein the perforations 42 are visible thereon. FIGURE 4 shows a section of the bag 40 where the perforations 42 are enlarged. FIGURE 5 shows a greatly enlarged perforation wherein the material is of a flap-like configuration which tends to close when no pressure is exerted at either side of the material but which will open easily when pressure differential is present on opposite sides of the material.

It is apparent that, while equal spacing is desired from a safety standpoint, it is not a necessary limitation if the bag is to be used merely as a breathable material which is water impermeable since, in this case, the perforations may run in strips or indiscriminately spaced in any direction through the material. However, since most bags are subjected to uses where the inherent dangers of the bag are apparent, it is most desirable to maintain the spacing uniform so that these dangers are completely overcome.

While the embodiments of the present invention as herein disclosed constitute preferred forms, it is to be understood that other forms might be adopted.

What is claimed is as follows:

1. A bag made from polyethylene material having an average thickness of about one-half mil and having perforations equally spaced therethrough wherein the perforations are on centers not greater than one-half inch or less than one-eighth inch, said perforations having an average diameter varying inversely to the spacing of between .020 and .045 inches wherein the material from said perforations remains as flaps attached to the body of the sheet and wherein the perforations are so small as to prevent the ingress of water therethrough due to its surface tension effect and to permit the permeation of air therethrough under light pressure differential.

2. A breathable plastic sheet, comprising, a plastic base sheet taken from the class consisting of polyethylene, "Mylar," polyvinyl alcohol, polyvinyl chloride, said sheet having a plurality of spaced vents therethrough wherein the material from said vents is still attached to the sheet, said vents being on centers not greater than ½″ or less than ⅛″, said perforations having an average diameter varying inversely to the spacing of between .020 and .045 inches wherein the material from the perforations remains as flaps attached to the body of the sheet and wherein the perforations are so small as to prevent the ingress of water therethrough due to its surface tension effect and to permit the permeation of air therethrough under slight pressure differential.

References Cited in the file of this patent

UNITED STATES PATENTS

| | | |
|---|---|---|
| 850,697 | Voss | Apr. 16, 1907 |
| 1,918,793 | Baker | July 18, 1933 |
| 2,081,219 | Chandler | May 25, 1937 |
| 2,115,122 | Prudden | Apr. 26, 1938 |
| 2,146,753 | Luckhaupt | Feb. 14, 1939 |
| 2,363,971 | Katz | Nov. 28, 1944 |
| 2,430,518 | Mainwal | Nov. 11, 1947 |
| 2,496,753 | Salfisberg | Feb. 7, 1950 |
| 2,667,822 | Christman | Feb. 2, 1954 |
| 2,704,099 | Wikle | Mar. 15, 1955 |